United States Patent [19]

Paul et al.

[11] 4,243,772

[45] Jan. 6, 1981

[54] POLYMERS WITH CONTROLLED SULFONIC ACID OR SULFONATE GROUP CONTENT AND A METHOD FOR THEIR SYNTHESIS

[76] Inventors: Swaraj Paul, Subhash Nagar, Bareilly, India; Bengt Rånby, Stenbocksvägen 21, Djursholm, Sweden

[21] Appl. No.: 958,133

[22] Filed: Nov. 6, 1978

Related U.S. Application Data

[63] Continuation of Ser. No. 735,494, Oct. 26, 1976, abandoned.

[51] Int. Cl.$^3$ ............................................. C08F 8/36
[52] U.S. Cl. .............................. 525/344; 260/17.4 R; 525/326; 525/329; 526/273; 526/287
[58] Field of Search ................ 526/287, 273; 525/344, 525/336, 339

[56] References Cited

U.S. PATENT DOCUMENTS

| | | | |
|---|---|---|---|
| 3,541,059 | 11/1970 | Schaper | 526/287 X |
| 3,579,565 | 5/1971 | Zaslowsky | 526/287 X |
| 3,784,525 | 6/1974 | Baumann | 526/273 |
| 3,852,256 | 12/1974 | Parker | 526/273 X |

*Primary Examiner*—C. A. Henderson
*Attorney, Agent, or Firm*—Kenway & Jenney

[57] ABSTRACT

A two step process for the preparation of polymers which contain an easily controllable amount of sulfonate groups. In the first step, a copolymerization or a graft copolymerization is carried out using a controlled amount of an epoxy group containing monomer, said monomer being an ester of 2,3-epoxy propyl alcohol and acrylic acid. In a second step, the epoxy groups of the polymer prepared in the first step are, via ring opening reaction, partially or fully sulfonated by means of sulfite ions in aqueous solution in the presence of a quaternary ammonium salt as a catalyst.

6 Claims, No Drawings

POLYMERS WITH CONTROLLED SULFONIC ACID OR SULFONATE GROUP CONTENT AND A METHOD FOR THEIR SYNTHESIS

This is a continuation division of application Ser. No. 735,494 filed Oct. 26, 1976, now abandoned.

BACKGROUND OF THE INVENTION

This invention relates to the preparation of new polymers with controlled amount of sulfonic acid or sulfonate groups.

By introducing ionic groups such as sulfonic acid groups in the polymer chains of water insoluble typis, modified polymers can be obtained which are soluble or dispersible in water. Polymers containing sulfonic acid or sulfonate groups have been found useful as thickeners, impregnating materials, binders, surface coating materials and adhesives. Being polyelectrolytes, they have even potential application as antistatic agents. Further they have also been shown to be applicable as ion-exchange resins and polymeric catalysts due to the presence of active strong sulfonic acid groups.

Two methods have mainly been used for the preparation of polymers containing sulfonic acid groups. One by direct polymerizing with sulfonate monomers such as ethylene sulfonic acid or sodium ethylene sulfonate (SES) and the other by introducing sulfonic acid groups in the existing polymer chains.

The main problem associated with the direct polymerization method is that only small amounts of water-insoluble monomers e.g., acrylonitrile (AN), methylacrylate (MA), methylmethacrylate (MMA) and vinyl acetate (VA) can be copolymerized with SES in aqneous media. However, copolymers of SES with VA and with styrene are readily prepared in aguesous dimethylsulfoxide (DMSO). Furthermore it was difficult to control these polymerization processes since SES concentration influences polymerization rate and molecular weight of the polymer.

For this reason the method of introducing the sulfonic acid groups in an existing polymer became dominating. The commonly used substrate for sulfonation of polymers so far was polystyrene. Sulfonation of the styrene units has been carried out by means of sulfonating agents like sulfurtrioxide, chlorosulfonic acid or a sulfurtri oxide complex, where the phenyl groups of the styrene units are sulfonated.

In the literature a number of methods for the preparation of water soluble or water insoluble polystyrene sulfonates have been described (see e.g. U.S. Pat. No. 2,631,127 and 3,259,592 or W.R. Carrol and H. Eisenberg, J. Polym. Sci., A-2, 4, 599 (1966)). The main disadvantages with these methods are to control the quality of the product duct due to the formation of sulfone cross-links between the polymer chains. These cross-links can for example result in water insoluble products instead of water soluble products. Furthermore sulfonation is carried out under rather extreme conditions e.g. from the point of view of reaction temperature and hazardous solvents. Besides the sulfonating agents which are used for such purposes are very reactive and thus need special care for handling and processing.

The object of the present invention is to obtain polymers with controlled amount of sulfonic acid or sulfonate groups by a method which makes it possible to obtain the desired sulfonic acid content in the end product without the formation of sulfone cross-links and which can be carried out under mild conditions.

SUMMARY OF THE INVENTION

According to the invention, polymers with controlled amount of epoxy groups containing monomers are obtained in the first stage. In the next stage, these epoxy groups are sulfonated either partially or fully by a ring opening reaction with the help of sulfite ions such as $Na_2SO_3$, in presence of an ionic surface active agent, which functions are "Phase-transfer" catalyst.

DETAILED DESCRIPTION OF THE INVENTION

In the first stage a copolymer, terpolymer or a graft copolymer is prepared with a controlled amount of epoxy groups containing units. The controlled amount of this chain unit in the polymers is achieved by addition of a definite amount of a monomer during polymerization which is an ester of 2,3-epoxy propyl alcohol and acrylic acid and has the formula:

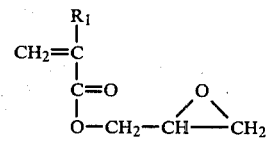

where $R_1$ is hydrogen (monomer is called glycidyl acrylate (GA)) or a methyl group (monomer is called glycidyl methacrylate (GMA)). Polymerization can either be a simple copolymerization (even a terpolymerization) or a simple graft copolymerization. In the case of copolymerization, GMA or GA is copolymerized with an olefin such as ethylene propylene or a vinyl monomer such as vinylacetate, styrene, acrylonitrile, methylacrylate, methylmethacrylate etc. One can even obtain terpolymers which contain a controlled amount of GA or GMA units by polymerizing with two different monomers of above mentioned types. Copolymerization and terpolymerizations carried out by radical polymerization as described earlier by M. S. Gluckman et. al., J. Polym. Sci., 37, 411 (1959), Y. Iwakura et al., Makromol. Chem. 97, 128 (1966) and F. T. Boerio et al., J. Polym. Sci., Polym. Phys., 11, 1841 (1973). GMA or GA can even be graft copolymerized on polysaccharides like cellulose by the known way e.g. according to E. Riande, A. A. M. Mateos and G. M. Guzman, Eur. Polym. J., 6, 437 (1970).

Polymerization product from the first stage can be characterized by the fact that it contains chain units with formula

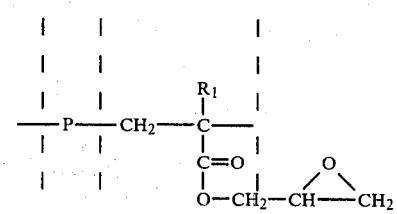

where P is a vinyl or olefinic monomer unit or polysaccharide part. The amount of GMA or GA units in the polymer is determined by the amount of GMA or GA added during the polymerization and the reactivity ratios of the monomers and in the normal cases it can be varied between 5 and 95 mol-% depending upon the required sulfonic acid groups to be introduced in the second stage.

In the second step of the process according to the invention, epoxy groups of the polymers prepared in the first step ar partially or fully sulfonated by reacting the polymers with sulfite ions e.g. in the form of sodium sulfite, in the presence of an ionic surface active agent which functions as "Phase-transfer" catalysts. Sulfonation occurs via ring opening reactions of the epoxy groups resulting in a product which contains chain units which can be represented by the following formula

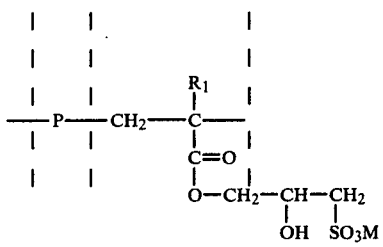

where P has the same meaning mentioned earlier, $R_1$ is a hydrogen or a methyl group and M is hydrogen or alkali metal.

Reaction is carried out in an aqueous solution of catalyst and sulfite ions in which the polymer is suspended. Since on the one hand it is desirable to achieve the maximum "salting-out"-effect and on the other hand the sulfite ion concentration also influences the ionic dissociation constant of the quarternary ammonium salts, a molar excess of sulfite ions in comparison to the epoxy groups is used but too high concentration of the sulfite ions may lead to decrease in reaction velocity. Preferably the molar ratio sulfite ions/epoxy groups used was in the range of 10:1 to 3:1. An applicable molar ratio of the sulfite ions/epoxy groups is 7:1.

Reaction temperature can be varied between 20° and 150° C. and lies normally in the range 60°–100° C. Reaction is carried out in an inert gas atmosphere in order to avoid autooxidation of the sulfite ions. Reaction velocity can be increased by swelling the polymers to some extent by the addition of a solvent for polymers such as chloroform in the case of copolymers of GMA and MMA. The amount of the solvent can be varied in the range 0.1–1 mol/l.

Since the phase-separation between the epoxy groups containing polymers and sulfite ion solution inhibits the reaction between the two reactants, the so called "Phase-transfer" catalysts must be added to the reaction mixture such as a quarternary ammonium salt. This catalyst is adsorbed on the surface of the finely suspended polymer particles by Langmuir-isotherms, the quarternary ammonium groups attracting sulfite ions from the agneous solution so that they can react with the expoxy groups in the polymers.

Examples of suitable "Phase-transfer" catalysts are: tetra-n-butyl ammonium bisulfate, tetra-n-butyl ammonium bromide, tetra-n-butyl ammonium chloride, tetra-n-butyl ammonium iodide etc. Since the adsorption of the "Phase-transfer" catalysts is of Langmuir-isotherm type, a catalyst concentration corresponding to the "saturation" point is selected, here "saturation" means when the reaction velocity becomes independent of the catalyst concentration. This "saturation concentration"'is, in general, in the range 2:1 to 5:1 mol catalyst/mol epoxy groups. Reaction is carried out by continuous stirring. Reaction time can vary to a large extent depending on the extent of sulfonation required and on other reaction conditions such as reaction temperature, addition of swelling-agent, sulfite concentration and catalysts concentration. Normally the reaction time is in the range 2–8 hours.

The amount of sulfonic acid in the polymers, which determines directly the water-solubility of polymers, depends as mentioned above on the amount of GMA or GA added during polymerization. Moreover sulfonic acid group content can also be controlled in the sulfonation stage by carring out partial sulfonation of the epoxy groups. Degree of sulfonation (i.e. mol opened epoxy rings/mol unreacted epoxy rings) can for example be varied with the reaction time. These polymers according to the invention, which contain sulfonated GMA or GA-units as well as unreacted epoxy groups can find extensive use as self cross-linking polymers which contain sulfonic acid groups.

If the sulfonating agent used is alkali sulfite, a sulfonate group is obtained at each epoxy ring opened. If instead sulfonic acid groups are desired in the end product, the polymers are allowed to pass through a cationic type ion exchange resin where the alkali metal atom is replaced by a hydrogen atom.

The invention shall now be further illustrated by means of a few examples, but the scope of the invention is not limited to only these examples.

EXAMPLE 1

A copolymer of methyl methacrylate (MMA) and glycidyl methacrylate (GMA) containing 34 mole-% of GMA ($\overline{M}n=5,500$) was prepared by radical polymerization of MMA and GMA with 2,2'-azo-bis-(isobutyronitrile) (AIBN) as initiator and thiophenol as chain transfer agent at 60° C. in an inert atmosphere.

0.5 g of the above MMA–GMA copolymer in the form of finely divided particle was suspended in 10 ml distilled water in glass ampoules to which was added 2.52 g $Na_2SO_3.7 H_2O$ (1 M) and 1,36 g tetra-n-butyl ammonium bisulfate (0.4 M). The ampoules were then evacuated and filled with nitrogen and then sealed. Ampoules were then tumbled in a thermostated oil bath at 80° C. After 6 hrs, the reaction was discontinued and the polymers were washed and dried. The extent of sulfonation was determined by IR and sulfur analysis. 50% of the epoxy groups in the polymers had reacted with the formation of sulfonate groups.

EXAMPLE 2

The same MMA–GMA copolymer was used as in example 1. 0,5 g of polymer was suspended in 10 ml distilled water in a glass ampoule, to which also 3,06 g $Na_2SO_3.7 H_2O$ (1,2 M) and 1,25 g tetra-n-butyl ammonium bromide (0,4 M) was added. Subsequently 0,96 g chloroform (0.8 mol/l) was added. The ampouls were evacuated, filled with nitrogen and sealed and then tumbeled in a thermostated oil bath at 80° C. After 7 hrs, the ampouls were opened and the polymers washed and dried. IR and sulfur analysis showed that 96% of the epoxy groups in the MMA–GMA copolymers was sulfonated.

EXAMPLE 3

A styrene—GA copolymer, which contained 28 mole-% GA and $\overline{M}n = 10\,000$ was prepared by radical copolymerization of styrene and GA with AIBN initiator and thiophenol as chain transfer agent at 60° C. in an inert atmosphere.

0,5 g of the obtained polymer was then suspended in 10 ml distilled water in a glass ampoule to which also 3.06 g Na$_2$SO$_3$.7 H$_2$O (1,2 mole/l) and 1,25 g tetra-n-butyl ammonium bromide (0,4 mole/l) was added. After four hours ampoule was opened and from sulfur analysis it was determined that 62% of the epoxy groups in the sytrene—GA copolymer was sulfonated.

What we claim is:

1. A process for the preparation of polymers with a controlled amount of sulfonic acid or sulfonate groups, said polymers having chain units of the formula:

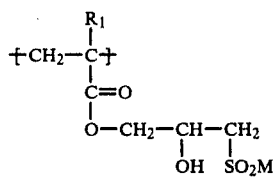

where M is selected from the group consisting of alkali metal atoms and hydrogen, said process being characterized by the following steps:

A. copolymerizing a monomer selected from the group consisting of ethylene, propylene, vinyl acetate, styrene, acrylonitrile, methyacrylate, and methyl methacrylate by a method known per se with a controlled amount of an epoxy group containing monomer of the formula:

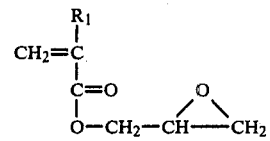

where R$_1$ is selected from the group consisting of hydrogen and a methyl radical; thereafter, B. sulfonating via epoxy ring opening by reacting the polymer produced in step a) with an alkali sulfite in aqueous solution at the temperature within the range of 20°–150° C. and in the presence of a tetra, lower alkyl quaternary ammonium salt phase transfer catalyst, and C. when M is hydrogen, passing the sulfonated product through a cationic ion exchange resin.

2. A process according to claim 1, characterized in that the sulfonation step (b) is discontinued so that a partially sulfonated product containing a desired amount of unreacted epoxy groups is obtained.

3. A process according to claim 1, characterized in that in the sulfonation step also an organic solvent is added, in which the polymer is soluble, in an amount of 1–20% by weight, based on the weight of the aqueous solution.

4. A process according to claim 1, characterized in that the sulfonation catalyst used is a tetra-n-butyl ammonium salt.

5. A process according to claim 1, characterized in that the alkali sulfite is added in molar excess with respect to the epoxy groups.

6. A process according to claim 5, characterized in that the molar ratio sulfite ions/epoxy groups is in the range 5:1 to 9:1.

* * * * *